United States Patent
Tsukagoshi (10) Patent No.: US 10,757,321 B2
(45) Date of Patent: Aug. 25, 2020

(54) DETECTION APPARATUS FOR DETECTING PORTION SATISFYING PREDETERMINED CONDITION FROM IMAGE, IMAGE PROCESSING APPARATUS FOR APPLYING PREDETERMINED IMAGE PROCESSING ON IMAGE, DETECTION METHOD, AND IMAGE PROCESSING METHOD

(71) Applicant: CASIO COMPUTER CO., LTD., Shibuya-ku, Tokyo (JP)

(72) Inventor: Takeshi Tsukagoshi, Tokyo (JP)

(73) Assignee: CASIO COMPUTER CO., LTD., Tokyo (JP)

(*) Notice: Subject to any disclaimer, the term of this patent is extended or adjusted under 35 U.S.C. 154(b) by 0 days.

(21) Appl. No.: 16/012,212

(22) Filed: Jun. 19, 2018

(65) Prior Publication Data

US 2018/0376056 A1 Dec. 27, 2018

(30) Foreign Application Priority Data

Jun. 21, 2017 (JP) ................... 2017-121412

(51) Int. Cl.
| | |
|---|---|
| *H04N 5/232* | (2006.01) |
| *H04N 1/60* | (2006.01) |
| *H04N 9/73* | (2006.01) |
| *H04N 9/04* | (2006.01) |
| *H04N 1/407* | (2006.01) |
| *H04N 1/62* | (2006.01) |

(52) U.S. Cl.
CPC ......... *H04N 5/23219* (2013.01); *H04N 1/407* (2013.01); *H04N 1/60* (2013.01); *H04N 1/628* (2013.01); *H04N 9/04* (2013.01); *H04N 9/735* (2013.01); *H04N 1/6077* (2013.01)

(58) Field of Classification Search
CPC ...... H04N 5/23219; H04N 1/628; H04N 1/60; H04N 9/735; H04N 9/04; H04N 1/407; H04N 1/6077
See application file for complete search history.

(56) References Cited

U.S. PATENT DOCUMENTS

| | | | | |
|---|---|---|---|---|
| 5,384,601 | A | * 1/1995 | Yamashita | ............... H04N 1/62 348/577 |
| 8,446,485 | B2 | 5/2013 | Matsumoto et al. | |
| 9,449,412 | B1 | * 9/2016 | Rogers | ..................... G06T 11/60 |

(Continued)

FOREIGN PATENT DOCUMENTS

| | | |
|---|---|---|
| JP | 2008042694 A | 2/2008 |
| JP | 2011044132 A | 3/2011 |

*Primary Examiner* — Timothy J Henn
(74) *Attorney, Agent, or Firm* — Holtz, Holtz & Volek PC (57) ABSTRACT

A detection method includes image acquisition processing for acquiring an image; white balance adjustment processing for adjusting a white balance of the image which is acquired in the image acquisition processing; control processing for controlling adjustment content of the white balance in the white balance adjustment processing, on the basis of a specific color serving as a reference; and detection processing for detecting a portion satisfying a predetermined condition relevant to the specific color from the acquired image in which the white balance has not adjusted, on the basis of the image in which the white balance has been adjusted by the adjustment content of the white balance controlled in the control processing.

14 Claims, 5 Drawing Sheets

(56) References Cited

U.S. PATENT DOCUMENTS

| | | | |
|---|---|---|---|
| 9,565,410 B2* | 2/2017 | Huai | G06T 5/007 |
| 2009/0009525 A1* | 1/2009 | Hirashima | H04N 1/62 |
| | | | 345/589 |
| 2010/0150439 A1* | 6/2010 | Lee | H04N 9/735 |
| | | | 382/167 |
| 2015/0054980 A1* | 2/2015 | Nikkanen | H04N 9/643 |
| | | | 348/223.1 |
| 2015/0195500 A1* | 7/2015 | Usui | H04N 9/735 |
| | | | 348/148 |
| 2016/0070955 A1* | 3/2016 | Kato | G06T 5/00 |
| | | | 382/195 |
| 2018/0350046 A1* | 12/2018 | Sasaki | G06T 5/008 |
| 2019/0122404 A1* | 4/2019 | Freeman | G06K 9/4652 |

* cited by examiner

PORTION IN WHICH SKIN COLOR IS SET TO BE NEUTRAL COLOR (GRAY)

FIG. 5

PORTION HAVING LOW SATURATION Sat

FIG. 6

PORTION HAVING HIGH PLAUSIBILITY OF SKIN COLOR

DETECTION APPARATUS FOR DETECTING PORTION SATISFYING PREDETERMINED CONDITION FROM IMAGE, IMAGE PROCESSING APPARATUS FOR APPLYING PREDETERMINED IMAGE PROCESSING ON IMAGE, DETECTION METHOD, AND IMAGE PROCESSING METHOD

This application is based on and claims the benefit of priority from Japanese Patent Application No. 2017-121412, filed on Jun. 21, 2017, the content of which is incorporated herein by reference.

BACKGROUND OF THE INVENTION

Field of the Invention

The present invention relates to a detection apparatus, an image processing apparatus, a detection method, and an image processing method.

Related Art

In the related art, a technology of applying image processing in which a skin color portion of a person included in an image, for example, is processed to be whitened, is known. In addition, in order to detect the skin color portion of the person, which is an image processing target, a technology of using hue information of an HSV color space is known. Furthermore, a technology of extracting a specific color area of the person who is a subject, for example, is described in JP 2011-44132 A.

However, in a case of using only the hue information in order to detect the skin color portion of the person, which is an image processing target, an area of a hue which is close to the skin color of the human, is also detected. Here, as with the technology described in JP 2011-44132 A, it is possible to increase an accuracy of the detection by using information relevant to a plurality of colors along with saturation information or the like, but the processing is complicated as the type of the information to be used increases. This is a problem which occurs regardless of the color space to be used. In addition, the color portion to be detected is the same even in a case of a portion other than the skin color portion of the person.

An object of the present invention is to reduce a load of processing for detecting a portion of a specific color included in an image, or a load of image processing applied to the portion of the specific color.

SUMMARY OF THE INVENTION

In an aspect according to the present invention, a detection method includes:
 image acquisition processing for acquiring an image;
 white balance adjustment processing for adjusting a white balance of the image which is acquired in the image acquisition processing;
 control processing for controlling adjustment content of the white balance in the white balance adjustment processing, on the basis of a specific color serving as a reference; and
 detection processing for detecting a portion satisfying a predetermined condition relevant to the specific color from the acquired image in which the white balance has not adjusted, on the basis of the image in which the white balance has been adjusted by the adjustment content of the white balance controlled in the control processing.

In another aspect according to the present invention, a detection method includes:
 image acquisition processing for acquiring an image;
 white balance adjustment processing for adjusting a white balance of the image which is acquired in the image acquisition processing;
 control processing for controlling adjustment content of the white balance in the white balance adjustment processing, on the basis of a specific color serving as a reference; and
 generation processing for generating map information for setting a position and an intensity in an image for applying predetermined image processing to the acquired image in which the white balance has not been adjusted, on the basis of the image in which the white balance has been adjusted by the adjustment content of the white balance, which is controlled in the control processing.

In still another aspect according to the present invention, a detection method includes:
 image acquisition processing for acquiring an image;
 conversion processing for converting a color balance in the image so that a ratio of RGB values of a specific color, serving as a reference, attains approximately 1:1:1, in the image which is acquired in the image acquisition processing; and
 detection processing for detecting a portion satisfying a predetermined condition relevant to the specific color from the acquired image in which the color balance has not been converted, on the basis of the image in which the color balance has been converted in the conversion processing.

In still another aspect according to the present invention, an image processing method includes:
 image acquisition processing for acquiring an image in which at least one element in a first color space has linear characteristics;
 white balance adjustment processing for adjusting a white balance of the image which is acquired in the image acquisition processing;
 control processing for controlling adjustment content of the white balance in the white balance adjustment processing, on the basis of a specific color serving as a reference;
 conversion processing for converting each of a plurality of portions in the image in which the white balance has been adjusted by the adjustment content of the white balance, which are adjusted in the control processing, into one element in a second color space; and
 image correction processing for applying predetermined image processing to the acquired image in which the white balance has not been adjusted, by using information which is converted in the conversion processing.

In still another aspect according to the present invention, a detection apparatus for detecting a portion satisfying a predetermined condition from an image includes a processor that is configured to:
 acquire an image;
 control adjustment content of a white balance, on the basis of a specific color serving as a reference;
 adjust a white balance of the acquired image by the controlled adjustment content of the white balance; and
 detect a portion satisfying a predetermined condition relevant to the specific color from the acquired image without adjusting the white balance, on the basis of the image in which the white balance has been adjusted.

In still another aspect according to the present invention, an image processing apparatus for applying predetermined image processing to an image includes a processor that is configured to:

acquire an image in which at least one element in a first color space has linear characteristics;

control adjustment content of a white balance, on the basis of a specific color serving as a reference;

adjust a white balance of the acquired image by the controlled adjustment content of the white balance;

convert each of a plurality of portions in the image in which the white balance has been adjusted, into one element in a second color space; and apply predetermined image processing with respect to the acquired image without the white balance being adjusted, by using converted information.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE INVENTION

Embodiments of the present invention will be explained with reference to the drawings.

Figure 1:
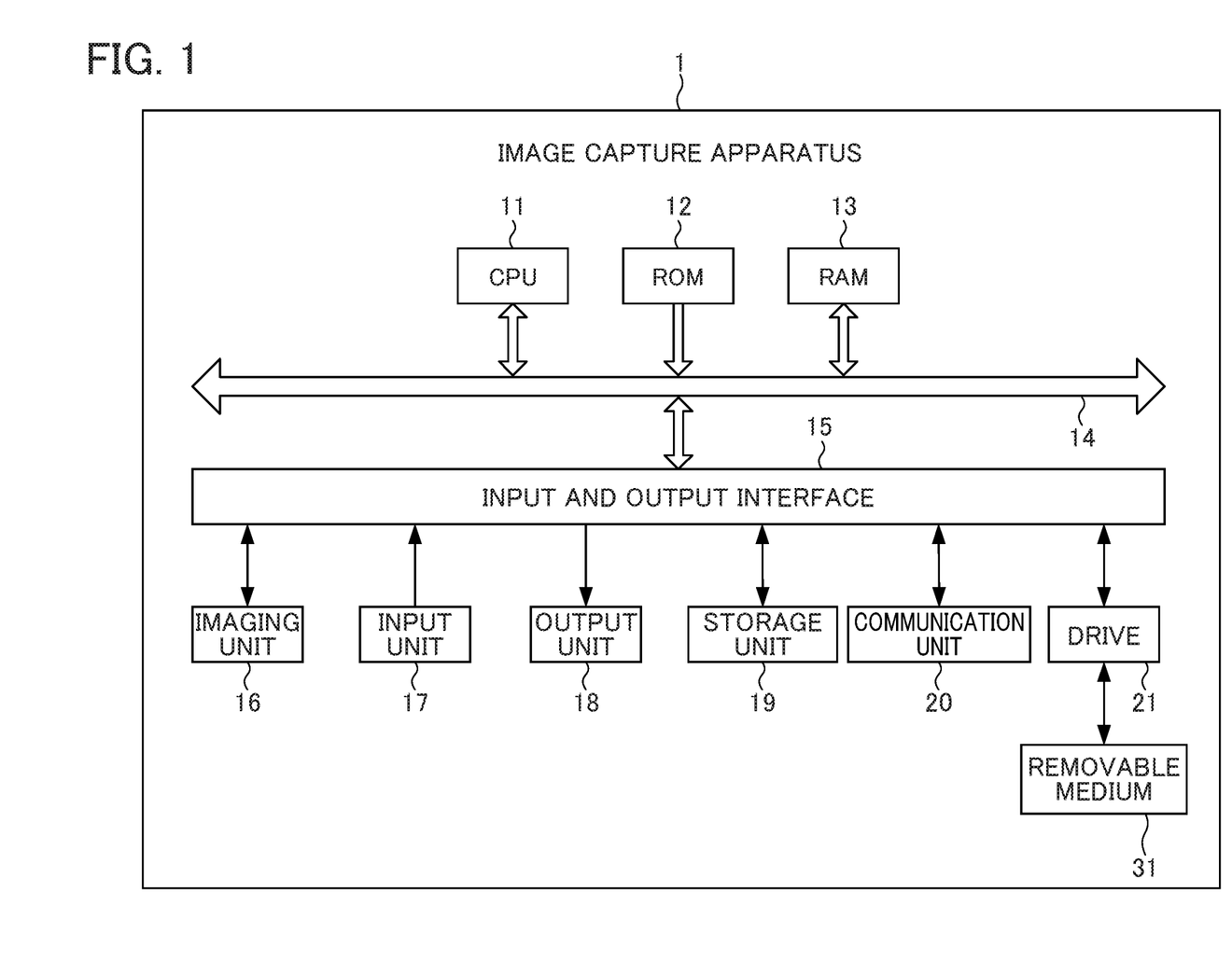
FIG. 1 is a block diagram illustrating a hardware configuration of an image capture apparatus according to one embodiment of a detection apparatus and an image processing apparatus of the present invention.

FIG. 1 is a block diagram showing the configuration of the hardware of the image capture apparatus 1. For example, the image capture apparatus 1 is a digital camera.

As shown in FIG. 1, the image capture apparatus 1 includes a processor (CPU) 11, a read only memory (ROM) 12, a random access memory (RAM) 13, a bus 14, an input-output interface 15, an image capture unit 16, an input unit 17, an output unit 18, a storage unit 19, a communication unit 20, and a drive 21.

The processor 11 executes various types of processing according to a program stored in the ROM 12 or a program loaded from the storage unit 19 into the RAM 13.

Data and the like required by the processor 11 executing the various processing is stored in the RAM 13 as appropriate.

The processor 11, the ROM 12, and the RAM 13 are connected to each other via the bus 14. In addition, the input-output interface 15 is also connected to this bus 14. The input-output interface 15 is further connected to the image capture unit 16, the input unit 17, the output unit 18, the storage unit 19, the communication unit 20, and the drive 21.

The image capture unit 16 includes an optical lens unit and an image sensor, which are not shown.

In order to photograph a subject, the optical lens unit is configured by a lens such as a focus lens and a zoom lens for condensing light. The focus lens is a lens for forming an image of a subject on the light receiving surface of the image sensor. The zoom lens is a lens that causes the focal length to freely change in a certain range. The image capture unit 16 also includes peripheral circuits to adjust setting parameters such as focus, exposure, white balance, and the like, as necessary.

The image sensor is configured by an optoelectronic conversion device, an AFE (Analog Front End), and the like. The optoelectronic conversion device is constituted by an optical sensor such as an optoelectronic conversion device of a CMOS (Complementary Metal Oxide Semiconductor) type. A subject image is incident upon the optoelectronic conversion device through the optical lens unit. The optoelectronic conversion device optoelectronically converts (i.e. captures) the image of the subject, accumulates the resultant image signal for a predetermined period of time, and sequentially supplies the image signal as an analog signal to the AFE. The AFE executes a variety of signal processing such as A/D (Analog/Digital) conversion processing of the analog signal. A digital signal is generated by various kinds of signal processing and is appropriately supplied as an output signal (RAW data or data in a predetermined image format) of the image capture unit 16 to the processor 11, an image processing unit (not shown), or the like.

The input unit 17 is constituted by various buttons, and the like, and inputs a variety of information in accordance with instruction operations by the user. The output unit 18 is constituted by a display, a speaker, and the like, and outputs images and sound. The storage unit 19 is constituted by DRAM (Dynamic Random Access Memory) or the like, and stores various kinds of data. The communication unit 20 controls communication with a different apparatus via the network 300 including the Internet.

A removable medium 31 composed of a magnetic disk, an optical disk, a magneto-optical disk, a semiconductor memory or the like is loaded in the drive 21, as necessary. Programs that are read via the drive 21 from the removable medium 31 are installed in the storage unit 19, as necessary. Like the storage unit 19, the removable medium 31 can also store a variety of data such as data of images stored in the storage unit 19.

In an image capture apparatus 1 of the present embodiment, white balance processing for setting a specific color to a neutral color (gray) is applied to data of an image in which linear characteristics (here, a ratio of RGB values of a pixel) are maintained before non-linear image processing such as gamma correction is applied (for example, data of an image which is output from an image capture unit 16, as RAW data). In the present embodiment, a skin color is a target, as an example of the specific color. The skin color as a target can be extracted from the image of the subject. In this case, in an image of a processing target, face detection is performed by using a known face detection technology, and thus, a face area is specified, and an R value, a B value, and a G value of each pixel in the specified face area are respectively integrated. It is assumed that the pixel in the face area is mainly a skin color, and thus, an integral value of each of the R value, the B value, and the G value of each of the pixels in the face area indicates a ratio of the R value, the B value, and the G value of the skin color (a ratio of RGB values). Then, an inverse number of the ratio of the acquired integral values of the R value, the G value, and the B value (a white balance gain) is multiplied by each of the R value, the G value, and the B value of each of the pixels in the image which is a processing target. That is, in a case where the ratio of the integral values of the R value, the G value, and the B value is Ri:Gi:Bi, 1/Ri, 1/Gi, and 1/Bi are multiplied by each of the R value, the G value, and the B value of each of the pixels of the image which is a processing target. Accordingly, the ratio of the R value, the G value, and the B value is close to 1:1:1, as the pixel is close to the skin color which is extracted from the specified face area. A pixel in which the ratio of the R value, the G value, and the B value is 1:1:1, is a pixel of a neutral color only having a brightness (a gray pixel in a range from white to black). For this reason, according to such processing, it is possible to set a skin color portion to be a neutral color (gray).

Then, in the data of the image of the processing target in which the skin color portion is set to be a neutral color (gray), a saturation Sat of each of the pixels is calculated. In a case where the saturation Sat is calculated from an RGB signal, the following conversion expression can be used. Here, the following expression is an example of a calculation expression of the saturation Sat, and a calculation expression of the saturation Sat which is defined in each color space can be used. Sat(x,y)=(RGBmax(x,y)−RGBmin(x,y))/RGBmax(x,y)

Furthermore, in the conversion expression described above, RGBmax(x,y) represents a maximum value in the R value, the G value, and the B value of a target pixel, and RGBmin(x,y) represents a minimum value of the R value, the G value, and the B value of the target pixel. As a result thereof, in the data of the image of the processing target, a state is obtained in which a pixel of a near-skin color is represented as a pixel having a low saturation Sat. That is, a state is obtained in which a skin color likeness is represented as one-dimensional data. Then, a threshold value of the saturation Sat can be set, and a range in which the saturation Sat is less than or equal to the threshold value, can be detected as the skin color portion. Further, in the present embodiment, in the data of the image of the processing target, the saturation Sat is converted into a plausibility of the skin color. Furthermore, in a case where the saturation Sat is converted into the plausibility of the skin color, a conversion expression can be set according to the object at the time of being utilized as the skin color area.

Figure 2:
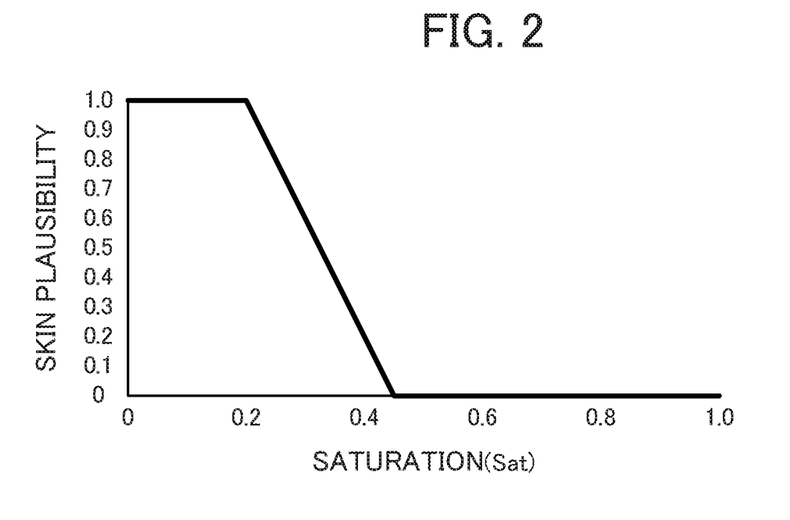
FIG. 2 is a schematic view illustrating an example of characteristics of a conversion expression of converting a saturation Sat into a plausibility of a skin color.

FIG. 2 is a schematic view illustrating an example of characteristics of the conversion expression of converting the saturation Sat into the plausibility of the skin color. As illustrated in FIG. 2, in the conversion expression of converting the saturation Sat into the plausibility of the skin color, in a case where the saturation Sat is from a minimum value (0) to a predetermined value (a core), the plausibility of the skin color is a maximum value (1), and in a case where the saturation Sat is greater than the predetermined value (the core), the plausibility of the skin color monotonically decreases at a predetermined slope. Then, after the plausibility of the skin color reaches the minimum value (0), the plausibility of the skin color is maintained to the minimum value (0), regardless of the value of the saturation Sat.

Then, in the plausibility of the skin color, the threshold value for determining that it is a skin color can be set, and an area in which the converted plausibility of the skin color is greater than or equal to the threshold value, can be detected as the skin color portion. Furthermore, the characteristics of a specific conversion expression illustrated in FIG. 2 can be suitably changed, and characteristics formed of a curve, such as S-characteristics, can be used insofar as the characteristics monotonically decrease. According to such processing, in the image where the person is a subject, it is possible to extract the skin color portion from the face area of the subject.

Figure 3:
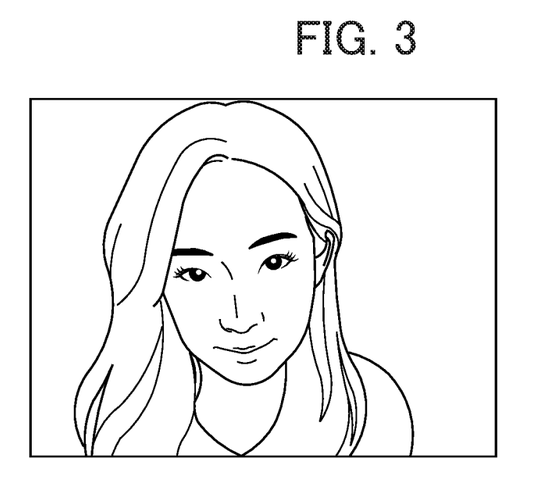
FIG. 3 is a schematic view illustrating an image of a processing target, in which a person is a subject.

Hereinafter, a process in which the skin color portion is extracted, will be described by using a specific image as an example. FIG. 3 is a schematic view illustrating the image of the processing target in which the person is a subject. In FIG. 3, the face of the subject is enlargedly captured, and an area other than the face and the neck (clothes, a background, or the like) is a color which is greatly different from the skin color. Face detection is performed on such an image of the processing target, and the R value, the B value, and the G value of each pixel in a face area are respectively integrated. Then, in a case where the inverse number of the ratio of the integral values of the R value, the G value, and the B value is multiplied by each of the R value, the G value, and the B value of each of the pixels of the image, which is a processing target, a state is obtained in which a portion close to the skin color is set to be a neutral color (gray).

Figure 4:
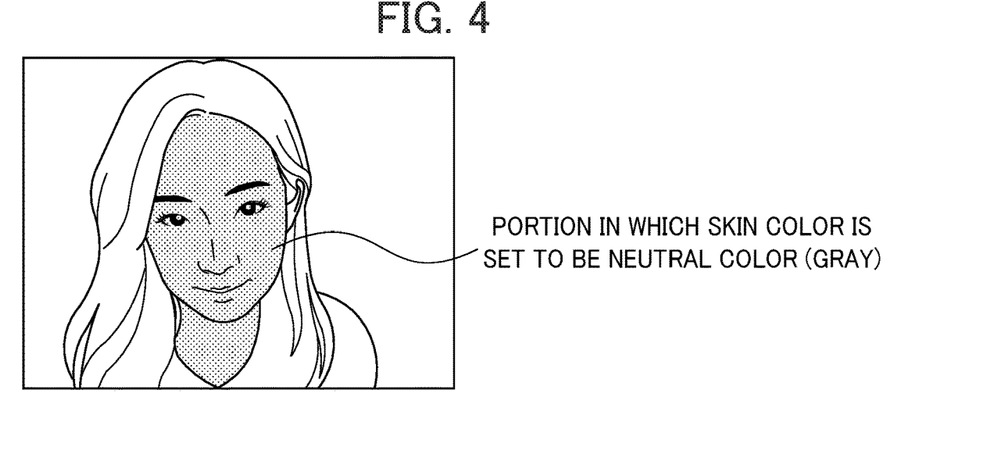
FIG. 4 is a schematic view illustrating a state in which a skin color portion in the image where the person is a subject, is set to be a neutral color (gray).

FIG. 4 is a schematic view illustrating a state in which the skin color portion in the image where the person is a subject, is set to be a neutral color (gray). As a result of multiplying the inverse number of the ratio of the integral values of the R value, the G value, and the B value by each of the R value, the G value, and the B value of each of the pixels of the image, which is a processing target, a state is obtained in which the portion close to the skin color is set to be a neutral color (gray). In the data of the image of the processing target in which the skin color portion is set to be a neutral color (gray), the saturation Sat of each of the pixels is calculated according to a predetermined conversion expression.

Figure 5:
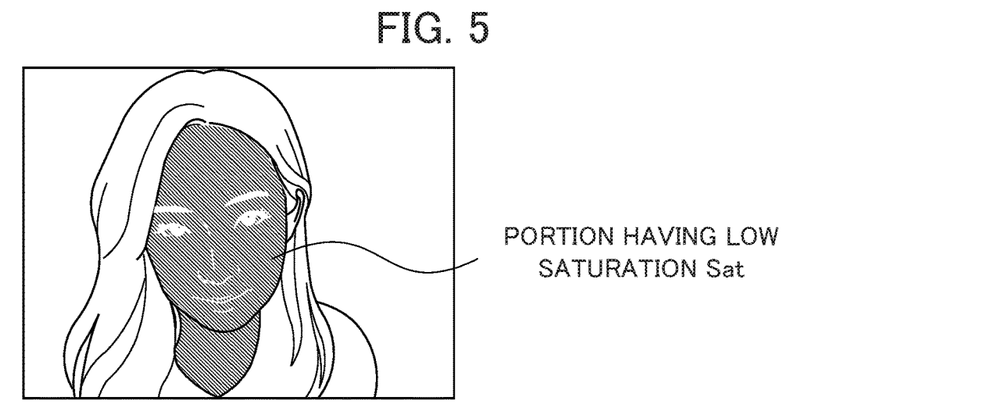
FIG. 5 is a schematic view illustrating the saturation Sat of the image in which the skin color area is set to be a neutral color (gray).

FIG. 5 is a schematic view illustrating the saturation Sat of the image in which the skin color area is set to be a neutral color (gray). In FIG. 5, the portion close to the skin color (a portion close to the neutral color) is a portion having a low saturation Sat (that is, a portion close to a black color). Thus, the saturation Sat of each of the pixels is acquired, and thus, it is possible to detect the skin color portion. Then, it is possible to obtain the plausibility of the skin color in each of the pixels according to the conversion expression described above, by using the saturation Sat as a parameter.

Figure 6:
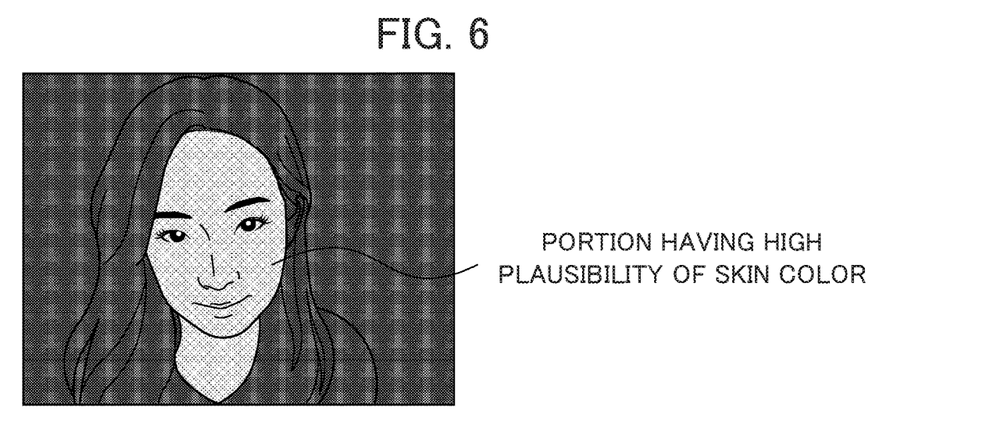
FIG. 6 is a schematic view illustrating a state in which the skin color portion is specified on the basis of the saturation Sat.

FIG. 6 is a schematic view illustrating a state in which the skin color portion is specified on the basis of the saturation Sat. An image illustrated in FIG. 6 illustrates a skin map of the image, which is a processing target (a map illustrating a skin color likeness of each of the portions), and a portion having a high plausibility of the skin color is illustrated by a color close to a white color. In the present embodiment, the skin map is used as a position for applying image processing of a makeup effect of whitening or smoothing the skin in the image, which is a processing target, and is used as map information indicating an intensity of the makeup effect.

[Functional Configuration]

Figure 7:
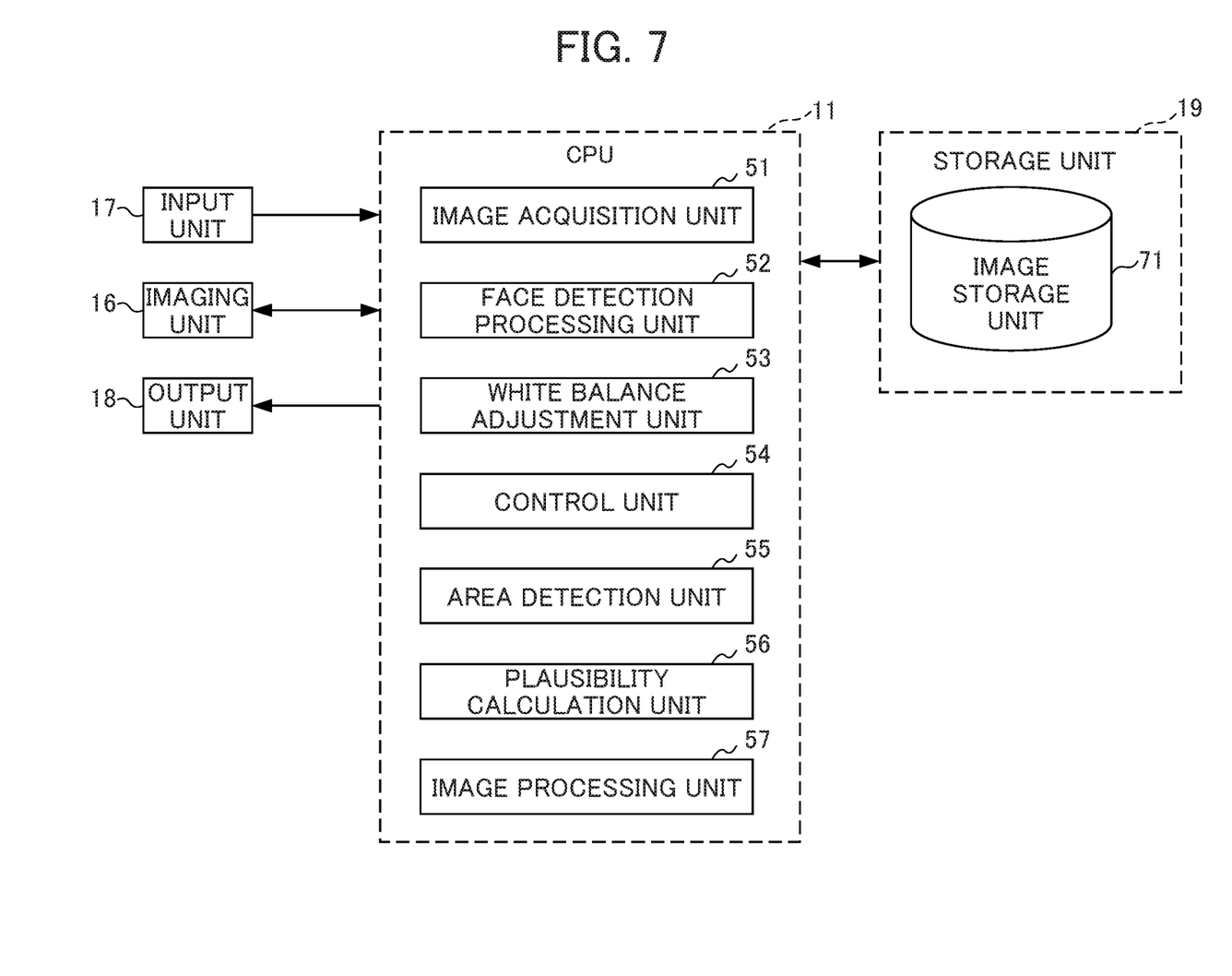
FIG. 7 is a functional block diagram illustrating a functional configuration for executing makeup processing, in a functional configuration of the image capture apparatus of FIG. 1.

FIG. 7 is a functional block diagram illustrating a functional configuration for executing makeup processing, in the functional configuration of the image capture apparatus 1 of FIG. 1. The makeup processing is a set of processings of specifying the skin color portion with a low processing load, and of applying the makeup effect to the specified skin color portion, by performing the white balance processing for setting the skin color portion of the subject to be a neutral color (gray). In a case where the makeup processing is executed, as illustrated in FIG. 7, the CPU 11 executes functions of an image acquisition unit 51, a face detection processing unit 52, a white balance adjustment unit 53, a control unit 54, an area detection unit 55, a plausibility calculation unit 56, and an image processing unit 57.

In addition, an image storage unit 71 is set in one area of a storage unit 19. Data of an imaged image which is acquired by the image capture unit 16 or an image which is acquired through a communication unit 20 or a drive 21 is stored in the image storage unit 71.

The image acquisition unit 51 acquires the data of the image, which is a processing target, from the image capture unit 16 or the image storage unit 71. Furthermore, in the present embodiment, the data of the image, which is a processing target, is the data of the image in which the linear characteristics are maintained before the non-linear image processing such as gamma correction is applied (for example, the data of the image which is output from the image capture unit 16 as the RAW data). In the following description, a case in which a portion of a specific color (a skin color) is set to be a neutral color (gray) according to the white balance processing, and is extracted from the image, which is acquired by the image capture unit 16 and is a processing target, and the makeup effect is applied to the extracted portion, will be described as an example.

The face detection processing unit 52 executes face detection processing with respect to the data of the image, which is a processing target. Specifically, the face detection processing unit 52 specifies the face area in the image, which is acquired by the image capture unit 16 and is a processing target, or the image, which is acquired by the image storage unit 71 and is a processing target. As a result of executing the face detection processing, the number of detections of the face, and coordinates of various face parts, such as coordinates of a face frame and eyes, coordinates of a nose, and coordinates of a mouth, in the image of the processing target, are detected. Furthermore, the face detection processing can be realized by using a known technology, and thus, the detailed description will be omitted.

The white balance adjustment unit 53 executes the white balance processing for adjusting a white balance according to the image of the processing target (hereinafter, suitably referred to as "white balance processing for development"), in development processing for generating an image for displaying (reproducing, live view displaying, or the like) or storing (retaining or the like with respect to a storing medium), or an image for a background and an image for makeup processing (described below), according to an instruction of the image processing unit 57.

In addition, the white balance adjustment unit 53 executes the white balance processing for setting the specific color (the skin color) to be a neutral color (gray) (hereinafter, suitably referred to as "white balance processing for detection") in order to extract a portion to which the makeup effect is applied, according to an instruction of the control unit 54. In the present embodiment, the white balance adjustment unit 53 multiplies the inverse number of the ratio of the integral values of the R value, the G value, and the B value, which is acquired by the control unit 54, by each of the R value, the G value, and the B value of each of the pixels of the image, which is a processing target. That is, in a case where the ratio of the integral values of the R value, the G value, and the B value is Ri:Gi:Bi, the white balance adjustment unit 53 multiplies 1/Ri, 1/Gi, and 1/Bi by each of the R value, the G value, and the B value of each of the pixels of the image, which is a processing target. Accordingly, the skin color portion is set to be a neutral color (gray).

The control unit 54 integrates each of the R value, the B value, and the G value of each of the pixels in the face area which is specified by the face detection processing unit 52, and acquires the ratio of the integral values of the R value, the G value, and the B value. Here, the acquired ratio of the integral values of the R value, the G value, and the B value is a control parameter for setting the specific color (the skin color) to be a neutral color (gray).

The area detection unit 55 calculates the saturation Sat of each of the pixels, in the data of the image of the processing target in which the skin color portion is set to be a neutral color (gray). In the data of the image of the processing target, it is indicated that the plausibility as the skin color increases, as the saturation Sat decreases, and the area detection unit 55 detects the area of the skin color (the skin color portion), on the basis of the saturation Sat of each of the pixels. For example, the threshold value of the saturation Sat can be set, and an area where the saturation Sat is less than or equal to the threshold value can be detected as the skin color portion. Furthermore, the area detection unit 55 is capable of detecting the area of the skin color (the skin color portion) on the basis of the saturation Sat of each of the pixels, and is also capable of detecting the area of the skin color (the skin color portion) on the basis of the skin map which is generated by the plausibility calculation unit 56 from the saturation Sat. In this case, in the plausibility of the skin color, the threshold value for determining that it is a skin color can be set, and an area in which the converted plausibility of the skin color is greater than or equal to the threshold value, can be detected as the skin color portion.

The plausibility calculation unit 56 converts the saturation Sat into the plausibility of the skin color, and generates the skin map. The image processing unit 57 executes the image processing for generating an image for displaying (reproducing, live view display, or the like) or storing (retaining or the like with respect to the storage medium) from the image, which is a processing target. In the present embodiment, in a case where the face of the person is not included in the image, which is a processing target, the image processing unit 57 performs the development processing with respect to the image, which is a processing target, and generates the image for displaying or storing.

In addition, in a case where the face of the person is included in the image, which is a processing target, the image processing unit 57 performs the development processing with respect to the image, which is a processing target, and generates the image for a background and the image for makeup processing. At this time, for example, color space conversion (conversion from a YUV color space to an RGB color space, or the like) is performed by using a conversion table which is different between the image for a background and the image for makeup processing. In the image for a background, a portion other than the skin color is mainly used as a background, and the image for makeup processing is mainly used for applying the makeup processing with respect to the skin color portion.

Further, the image processing unit 57 applies the makeup effect to the image for makeup processing. Then, the image processing unit 57 compounds (a blends) the image for a background and the image for makeup processing to which the makeup effect is applied, on the basis of the skin map, and thus, generates the image for display or storing. Furthermore, in a case where the image for display or storing, or the image for a background and the image for makeup processing are generated according to the development processing, the white balance processing for development, image format conversion processing, or the like is executed. At this time, in the present embodiment, the image processing unit 57 controls the white balance adjustment unit 53, and thus, the white balance processing for development is executed.

[Operation]

Next, an operation will be described.

[Makeup Processing]

Figure 8:
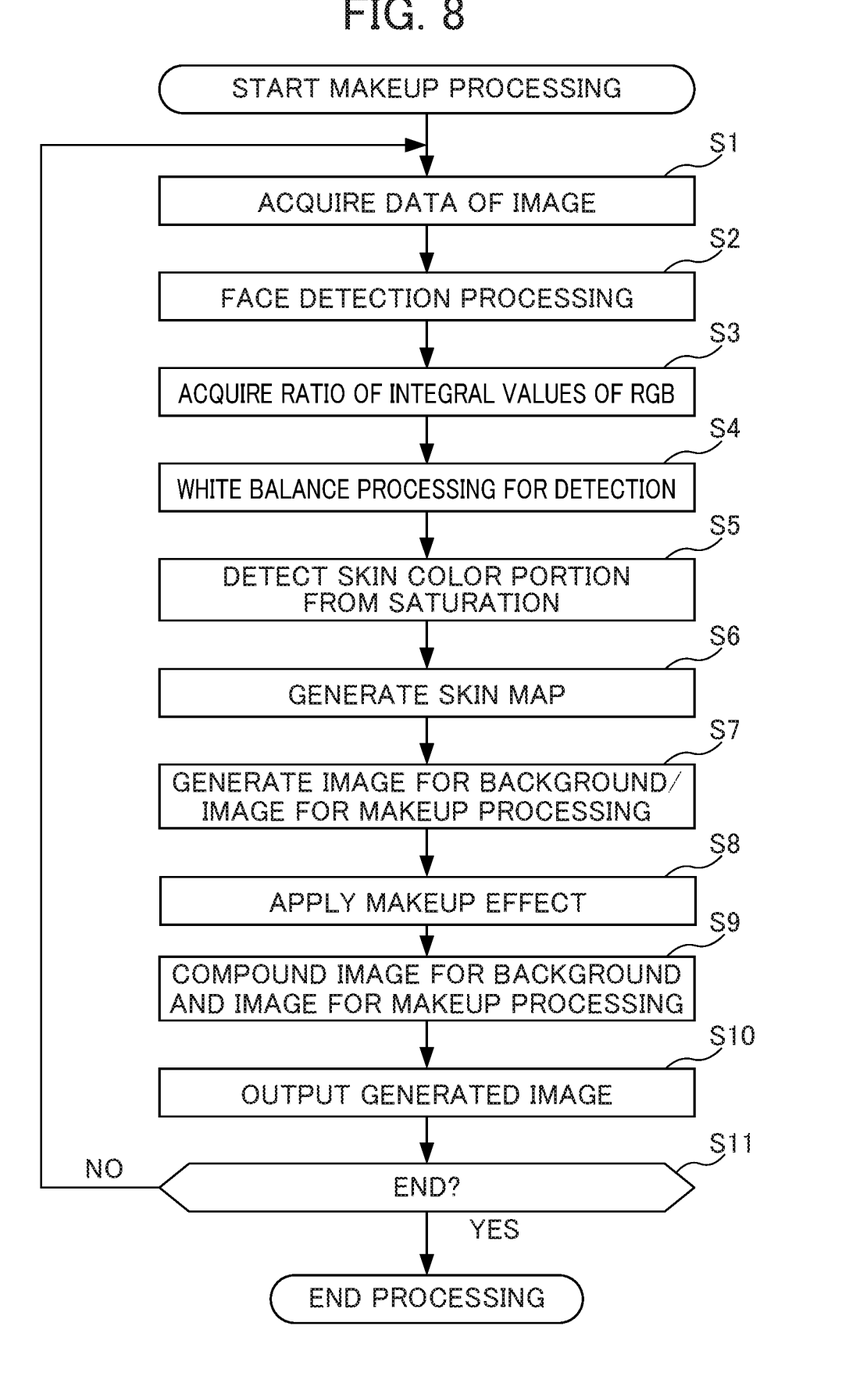
FIG. 8 is a flowchart illustrating a flow of the makeup processing which is executed by the image capture apparatus of FIG. 1, having the functional configuration of FIG. 7.

FIG. 8 is a flowchart illustrating a flow of the makeup processing which is executed by the image capture apparatus 1 of FIG. 1, having the functional configuration of FIG. 7. The makeup processing is started corresponding to the input of a manipulation of instructing the input unit 17 to execute the makeup processing by a user. For example, in a case where a mode of applying the makeup processing with respect to the imaged image is set by the user, the makeup processing is executed every the imaged image is acquired.

In Step S1, the image acquisition unit 51 acquires the data of the image, which is a processing target (here, the data of the image which is output from the image capture unit 16 as the RAW data) from the image capture unit 16 or the image storage unit 71. In Step S2, the face detection processing unit 52 executes the face detection processing with respect to the data of the image, which is a processing target.

In Step S3, the control unit 54 integrates each of the R value, the B value, and the G value of each of the pixels in the face area which is specified by the face detection processing unit 52, and acquires the ratio of the integral values of the R value, the G value, and the B value. In Step S4, the white balance adjustment unit 53 executes the white balance processing for detection of setting the specific color (the skin color) to be a neutral color (gray) in order to extract a portion to which the makeup effect is applied, according to the instruction of the control unit 54. That is, the white balance adjustment unit 53 multiplies the inverse number of the ratio of the integral values of the R value, the G value, and the B value, which is acquired by the control unit 54, by each of the R value, the G value, and the B value of each of the pixels in the specified face area.

In Step S5, the area detection unit 55 calculates the saturation Sat of each of the pixels, in the data of the image of the processing target, in which the skin color portion is set to be a neutral color (gray), and detects the area of the skin color (the skin color portion) on the basis of the saturation Sat of each of the pixels. In Step S6, the plausibility calculation unit 56 converts the saturation Sat into the plausibility of the skin color, and generates the skin map. In Step S7, the image processing unit 57 performs the development processing with respect to the image, which is a processing target, and generates the image for a background and the image for makeup processing. At this time, in the development processing which is executed, the same white balance processing for development as that in a case of general development processing is included.

In Step S8, the image processing unit 57 applies the makeup effect to the image for makeup processing. In Step S9, the image processing unit 57 compounds (a blends) the image for a background, and the image for makeup processing to which the makeup effect is applied, on the basis of the skin map, and thus, generates the image for display or storing. In Step S10, the image processing unit 57 outputs the generated image to a display of an output unit 18 or the storage unit 19.

In Step S11, the image processing unit 57 determines whether or not an end condition of the makeup processing is satisfied. In the present embodiment, for example, it is possible to input an end instruction of live view display or an end instruction of image reproducing, or to define that the storing of the image for storing is completed, as the end condition of the makeup processing. In a case where the end condition of the makeup processing is not satisfied, it is determined as NO in Step S11, and the processing proceeds to Step S1. On the other hand, in a case where the end condition of the makeup processing is satisfied, it is determined as YES in Step S1, and the makeup processing is ended.

According to such processing, it is possible to apply the white balance processing for setting the specific color (the skin color) to be a neutral color (gray), with respect to the data of the image in which the linear characteristics are maintained. Then, in the data of the image of the processing target, in which the skin color portion is set to be a neutral color (gray), it is possible to calculate the saturation Sat of each of the pixels. As a result thereof, in the data of the image of the processing target, a state is obtained in which a pixel of a near-skin color is represented as a pixel having a low saturation Sat, and the saturation Sat is converted into the plausibility of the skin color, and thus, it is possible to generate the skin map representing the skin color likeness of each of the portions. For this reason, when the plausibility of the skin color representing the skin color likeness is calculated, it is possible to calculate the plausibility of the skin color by a one-dimensional parameter, without performing complicate calculation such as area hoarding in a two-dimension or a three-dimension. Therefore, it is possible to reduce a processing load for detecting the portion of the specific color (the skin color) of the person included in the image. In addition, it is possible to reduce a processing load at the time of applying the image processing with respect to the portion of the specific color (the skin color) of the person included in the image.

In addition, in the makeup processing described above, the data of the image in which the linear characteristics are maintained, is a processing target, and thus, it is possible to suppress an influence due to an environmental difference at the time of capturing. Further, in the makeup processing described above, the portion of the specific color (the skin color portion) is extracted by using the specific color (the skin color) which is extracted from the image of the subject, as a standard, and thus, when the portion of the specific color (the skin color portion) in the image is detected, it is possible to suppress an influence due to a difference in the subject.

Modification Example 1

In the embodiment described above, the skin map is prepared, and the image for makeup processing is compounded to the image for a background by using the prepared skin map, and thus, the processing for applying the makeup effect is executed. On the contrary, the present invention can be used in order to detect the portion of the specific color in the image of the processing target by generating the image in which the specific color (the skin color) is set to be a neutral color (gray), without performing the processing for applying the makeup effect. For example, the present invention can be used in order to detect a ratio of the portions of the specific color, in the image of the processing target. It is possible to apply the present invention to scene determination or the like, and to determine whether or not the image of the processing target is a scene in which the priority is given to the person, from the ratio of the portions of the skin color, by generating a histogram or the like, as an example.

Modification Example 2

In the embodiment described above, a case where the skin color portion is set to be a neutral color (gray) in the RGB color space, is described as an example. On the contrary, it is possible to perform the processing for setting the skin color portion to be a neutral color (gray) in various color spaces other than the RGB color space, and to use the skin color likeness as one-dimensional data indicating the degree of skin color a neutral color. In this case, as described above, data of the image in which characteristics of an element affecting a saturation are maintained, in various color spaces, can be used as the data of the image of the processing target, in which the linear characteristics are maintained, other than the data of the image in which the ratio of RGB values of the pixel (that is, linear properties of a luminance in the RGB color space) are maintained. The present invention can be applied by setting the image data to input, by setting the specific color to a standard as with the embodiment described above, and by converting the value of each of the pixels into a parameter indicating the saturation in the color space. That is, the present invention is capable of reducing a load of the processing for detecting the portion of the specific color included in the image or a load of the image processing applied with respect to the portion of the specific color, without being limited to a specific color space.

The image capture apparatus 1 configured as described above, includes the image acquisition unit 51, the white balance adjustment unit 53, the control unit 54, and the area detection unit 55. The image acquisition unit 51 acquires an image. The white balance adjustment unit 53 adjusts the white balance of the image, which is acquired by the image acquisition unit 51. The control unit 54 controls adjustment content of the white balance of the white balance adjustment unit 53, on the basis of the specific color, serving as a reference. The area detection unit 55 detects a portion satisfying a predetermined condition relevant to a specific color, from the acquired image, on the basis of the image of which the adjustment content of the white balance is controlled by the control unit 54. Accordingly, it is possible to detect the portion of the specific color in the image of the processing target, according to an algorithm of the white balance processing. Therefore, it is possible to reduce a processing load for detecting the portion of the specific color of the person included in the image.

The control unit 54 controls the adjustment content of the white balance of the white balance adjustment unit 53 such that the specific color has a predetermined saturation. The area detection unit 55 detects the portion satisfying the predetermined condition relevant to the specific color from the acquired image, on the basis of a saturation of each of a plurality of portions in the image of which the adjustment content of the white balance is controlled. Accordingly, a specific color-like portion can be detected by using the saturation as a parameter, and thus, it is possible to reduce a processing load for detecting the portion satisfying the predetermined condition relevant to the specific color.

In addition, the image capture apparatus 1 includes the plausibility calculation unit 56. The control unit 54 controls the adjustment content of the white balance of the white balance adjustment unit 53 such that the specific color is a neutral color. The plausibility calculation unit 56 calculates a specific color plausibility, which is a specific color likeness, on the basis of the saturation of each of the plurality of portions in the image of which the adjustment content of the white balance is controlled. The area detection unit 55 detects the portion satisfying the predetermined condition relevant to the specific color from the acquired image, on the basis of the specific color plausibility which is calculated by the plausibility calculation unit 56. Accordingly, it is possible to simply detect the specific color-like portion in the image with reference to the specific color plausibility indicating the specific color likeness.

In addition, the image capture apparatus 1 includes the image processing unit 57. The image processing unit 57 applies predetermined image processing with respect to the portion satisfying the predetermined condition relevant to the specific color, which is detected by the area detection unit 55. Accordingly, it is possible to apply the predetermined image processing by simply extracting the portion satisfying the predetermined condition relevant to the specific color.

In addition, the image capture apparatus 1 includes the image acquisition unit 51, the white balance adjustment unit 53, the control unit 54, and the plausibility calculation unit 56. The image acquisition unit 51 acquires an image. The white balance adjustment unit 53 adjusts the white balance of the image which is acquired by the image acquisition unit 51. The control unit 54 controls the adjustment content of the white balance of the white balance adjustment unit 53, on the basis of the specific color serving as a reference. The plausibility calculation unit 56 generates map information for setting a position and an intensity in the image for applying the predetermined image processing with respect to the acquired image, on the basis of the image of which the adjustment content of the white balance is controlled by the control unit 54. Accordingly, it is possible to detect the portion of the specific color in the image of the processing target, and to set the position and the intensity in the image for applying the predetermined image processing, according to the algorithm of the white balance processing. Therefore, it is possible to reduce a processing load at the time of applying the image processing with respect to the portion of the specific color of the person included in the image.

The control unit 54 controls the adjustment content of the white balance of the white balance adjustment unit 53 such that the specific color has a predetermined saturation. The plausibility calculation unit 56 generates the map information on the basis of the saturation of each of the plurality of portions in the image of which the adjustment content of the white balance is controlled. Accordingly, the map information indicating the specific color-like portion can be generated by using the saturation as a parameter, and thus, it is possible to reduce a processing load for setting the position and the intensity in the image for applying the predetermined image processing.

In addition, the image capture apparatus 1 includes the plausibility calculation unit 56. The control unit 54 controls the adjustment content of the white balance of the white balance adjustment unit 53 such that the specific color is a neutral color. The plausibility calculation unit 56 calculates the specific color plausibility which is the specific color likeness, on the basis of the saturation of each of the plurality of portions in the image of which the adjustment content of the white balance is controlled. The plausibility calculation unit 56 generates the map information on the basis of the calculated specific color plausibility. Accordingly, it is possible to simply detect the specific color-like portion in the image, with reference to the map information.

In addition, the image capture apparatus 1 includes the image processing unit 57. The image processing unit 57 applies the predetermined image processing with respect to the acquired image, by using the map information which is generated by the plausibility calculation unit 56. Accordingly, it is possible to apply the predetermined image processing by simply extracting the specific color-like portion in the image.

The image processing unit 57 acquires an image having linear characteristics. Accordingly, when the predetermined image processing is performed, it is possible to suppress an influence due to a difference in the environment at the time of capturing.

In addition, the image capture apparatus 1 includes the face detection processing unit 52 and the control unit 54. The face detection processing unit 52 detects the face area included in the image. The control unit 54 acquires the specific color from the face area which is detected by the face detection processing unit 52. The control unit 54 controls the adjustment content of the white balance of the white balance adjustment unit 53, on the basis of the acquired specific color. Accordingly, when the portion of the specific color in the image is detected, it is possible to suppress an influence due to a difference in the subject.

In addition, the image capture apparatus 1 includes the image acquisition unit 51, the white balance adjustment unit 53, and the area detection unit 55. The image acquisition unit 51 acquires an image. The white balance adjustment unit 53 converts a color balance in the image such that the ratio of each of the RGB values of the specific color, serving as a reference, is the same, in the image which is acquired by the image acquisition unit 51. The area detection unit 55 detects the portion satisfying the predetermined condition relevant to the specific color from the acquired image, on the basis of the image in which the color balance has been converted by the white balance adjustment unit 53. Accordingly, it is possible to detect the portion of the specific color in the image of the processing target, by setting the specific color, serving as a reference, to be a neutral color (gray). Therefore, it is possible to reduce a processing load for detecting the portion of the specific color of the person included in the image.

In addition, the image capture apparatus 1 includes the image acquisition unit 51, the white balance adjustment unit 53, the control unit 54, and the image processing unit 57. The image acquisition unit 51 acquires an image in which at least one element in a first color space has linear characteristics. The white balance adjustment unit 53 adjusts the white balance of the image which is acquired by the image acquisition unit 51. The control unit 54 controls the adjustment content of the white balance of the white balance adjustment unit 53, on the basis of the specific color serving as a reference. The white balance adjustment unit 53 converts each of the plurality of portions in the image of which the adjustment content of the white balance is controlled by the control unit 54, into one element in a second color space. The image processing unit 57 applies the predetermined image processing with respect to the acquired image, by using information which is converted by the white balance adjustment unit 53. Accordingly, it is possible to apply the predetermined image processing by simply extracting the specific color-like portion in the image. Therefore, it is possible to reduce a processing load at the time of applying the image processing with respect to the portion of the specific color of the person included in the image.

The control unit 54 controls the adjustment content of the white balance of the white balance adjustment unit 53 such that one element in the second color space satisfies a predetermined condition, in the portion of the specific color in the image. Accordingly, the specific color serving as a reference in the first color space, can be used as a condition relevant to one element in the second color space. Therefore, it is possible to reduce a processing load at the time of applying the image processing with respect to the portion of the specific color of the person included in the image.

Furthermore, the present invention is not limited to the embodiments described above, and modifications, improvements, and the like within a range where the object of the present invention can be attained, are included in the present invention. For example, in the embodiment described above, in a case where the control unit 54 integrates each of the R value, the B value, and the G value of each of the pixels in the face area, a pixel only of a portion having a high possibility that it is a skin color may be set as a target, by excluding the portion of the mouth or the eyes in the face area.

In addition, in the embodiment described above, the specific color (the skin color) which is a makeup processing target, is extracted from the image of the subject. On the contrary, the values of RGB indicating the specific color, or the like can be set in advance in the specific color (the skin color) which is a makeup processing target. In this case, in a color which is defined as a skin color, the inverse number of the ratio of the R value, the G value, and the B value of the color after the white balance processing for development is applied, is multiplied by each of the R value, the G value, and the B value of each of the pixels, and thus, the skin color portion can be set to be a neutral color (gray).

In the above embodiment, the makeup processing has been described as an example of image processing to which the present invention is applied, but the present invention is not limited thereto. For example, the present invention can be applied to various image processing such as soft focus processing.

In addition, in the embodiment described above, in a case where an image in an RGB format is generated by performing the development processing with respect to the RAW data, for example, filter processing of 3 pixels×3 pixels is applied, and thus it is possible to generate one pixel in an RGB format from nine pixels in the vicinity of a target pixel. Here, the size of a filter which is applied to the RAW data, can be suitably changed according to the application.

Although in the embodiment described above, a digital camera is adopted as an example for explaining the image capture apparatus 1 to which the present invention is applied, but the embodiment is not limited thereto. For example, the present invention can be applied to electronic devices in general that include a makeup processing function. For example, the present invention can be applied to a notebook type personal computer, a printer, a television receiver, a camcorder, a portable type navigation device, a cellular phone, a smartphone, a portable game device, and the like.

The processing sequence described above can be executed by hardware, and can also be executed by software. In other words, the hardware configuration of FIG. 7 is merely illustrative examples, and the present invention is not particularly limited thereto. More specifically, the types of functional blocks employed to realize the above-described functions are not particularly limited to the examples shown in FIG. 7, so long as the image capture apparatus 1 can be provided with the functions enabling the aforementioned processing sequence to be executed in its entirety. A single functional block may be constituted by a single piece of hardware, a single installation of software, or a combination thereof. The functional configurations of the present embodiment are realized by a processor executing arithmetic processing, and processors that can be used for the present embodiment include a unit configured by a single unit of a variety of single processing devices such as a single processor, multi-processor, multi-core processor, etc., and a unit in which the variety of processing devices are combined with a processing circuit such as ASIC (Application Specific Integrated Circuit) or FPGA (Field-Programmable Gate Array).

In the case of having the series of processing executed by software, the program constituting this software is installed from a network or storage medium to a computer or the like. The computer may be a computer equipped with dedicated hardware. In addition, the computer may be a computer capable of executing various functions, e.g., a general purpose personal computer, by installing various programs.

The storage medium containing such a program can not only be constituted by the removable medium 31 of FIG. 1 distributed separately from the device main body for supplying the program to a user, but also can be constituted by a storage medium or the like supplied to the user in a state incorporated in the device main body in advance. The removable medium 31 is composed of, for example, a magnetic disk (including a floppy disk), an optical disk, a magnetic optical disk, or the like. The optical disk is composed of, for example, a CD-ROM (Compact Disk-Read Only Memory), a DVD (Digital Versatile Disk), Blu-ray (Registered Trademark) or the like. The magnetic optical disk is composed of an MD (Mini-Disk) or the like. The storage medium supplied to the user in a state incorporated in the device main body in advance is constituted by, for example, the ROM 12 of FIG. 1 in which the program is stored, and a hard disk included in the storage unit 19 of FIG. 1, and the like.

It should be noted that, in the present specification, the steps defining the program stored in the storage medium include not only the processing executed in a time series following this order, but also processing executed in parallel or individually, which is not necessarily executed in a time series.

The embodiments of the present invention described above are only illustrative, and are not to limit the technical scope of the present invention. The present invention can assume various other embodiments. Additionally, it is possible to make various modifications thereto such as omissions or replacements within a scope not departing from the spirit of the present invention. These embodiments or modifications thereof are within the scope and the spirit of the invention described in the present specification, and within the scope of the invention recited in the claims and equivalents thereof.

What is claimed is:

1. A detection method, comprising:
   acquiring an image;
   adjusting a white balance of the acquired image based on a specific color serving as a reference; and
   detecting a portion satisfying a predetermined condition relevant to the specific color from the acquired image in which the white balance has not been adjusted, based on the image in which the white balance has been adjusted.

2. The detection method according to claim 1, wherein the portion satisfying the predetermined condition relevant to the specific color is detected from the acquired image based on a saturation of each of a plurality of portions in the image in which the white balance has been adjusted.

3. The detection method according to claim 1, wherein:
   the white balance is adjusted such that the specific color becomes a neutral color,
   the detection method further comprises calculating a specific color plausibility, which is a specific color likeness, based on a saturation of each of a plurality of portions in the image in which the white balance has been adjusted, and
   the portion satisfying the predetermined condition relevant to the specific color is detected from the acquired image based on the calculated specific color plausibility.

4. The detection method according to claim 1, further comprising:
   applying predetermined image processing to the detected portion satisfying the predetermined condition relevant to the specific color.

5. The detection method according to claim 1, wherein an image having linear characteristics is acquired as the acquired image.

6. The detection method according to claim 1, further comprising:
   detecting a face area included in an image; and
   acquiring the specific color from the detected face area.

7. A detection method, comprising:
   acquiring an image;
   adjusting a white balance of the acquired image, based on a specific color serving as a reference; and
   generating map information for setting a position and an intensity in an image for applying predetermined image processing to the acquired image in which the white balance has not been adjusted, based on the image in which the white balance has been adjusted.

8. The detection method according to claim 7, wherein the map information is generated based on a saturation of each of a plurality of portions in the image in which the white balance has been adjusted.

9. The detection method according to claim 7, wherein:
   the white balance is adjusted such that the specific color becomes a neutral color,
   the detection method further comprises calculating a specific color plausibility, which is a specific color likeness, based on a saturation of each of a plurality of portions in the image in which the white balance has been adjusted, and
   the map information is generated based on the calculated specific color plausibility.

10. The detection method according to claim 7, further comprising:
    applying the predetermined image processing to the acquired image in which the white balance has not been adjusted, by using the generated map information.

11. The detection method according to claim 7, wherein an image having linear characteristics is acquired as the acquired image.

12. The detection method according to claim 7, further comprising:
    detecting a face area included in an image; and
    acquiring the specific color from the detected face area.

13. A detection method, comprising:
acquiring an image;
converting a color balance in the acquired image so that a ratio of RGB values of a specific color, serving as a reference, attains approximately 1:1:1; and
detecting a portion satisfying a predetermined condition relevant to the specific color from the acquired image in which the color balance has not been converted, based on the basis of the image in which the color balance has been converted.

14. A detection apparatus comprising:
a processor that is configured to:
acquire an image;
adjust a white balance of the acquired based on a specific color serving as a reference; and
detect a portion satisfying a predetermined condition relevant to the specific color from the acquired image without adjusting the white balance, based on the image in which the white balance has been adjusted.

* * * * *

UNITED STATES PATENT AND TRADEMARK OFFICE
CERTIFICATE OF CORRECTION

| | | |
|---|---|---|
| PATENT NO. | : 10,757,321 B2 | Page 1 of 1 |
| APPLICATION NO. | : 16/012212 | |
| DATED | : August 25, 2020 | |
| INVENTOR(S) | : Takeshi Tsukagoshi | |

It is certified that error appears in the above-identified patent and that said Letters Patent is hereby corrected as shown below:

In the Claims

Column 17, Line 14, Claim 14 after "acquired" insert --image--.

Signed and Sealed this
First Day of December, 2020

Andrei Iancu
*Director of the United States Patent and Trademark Office*